Figure 1:
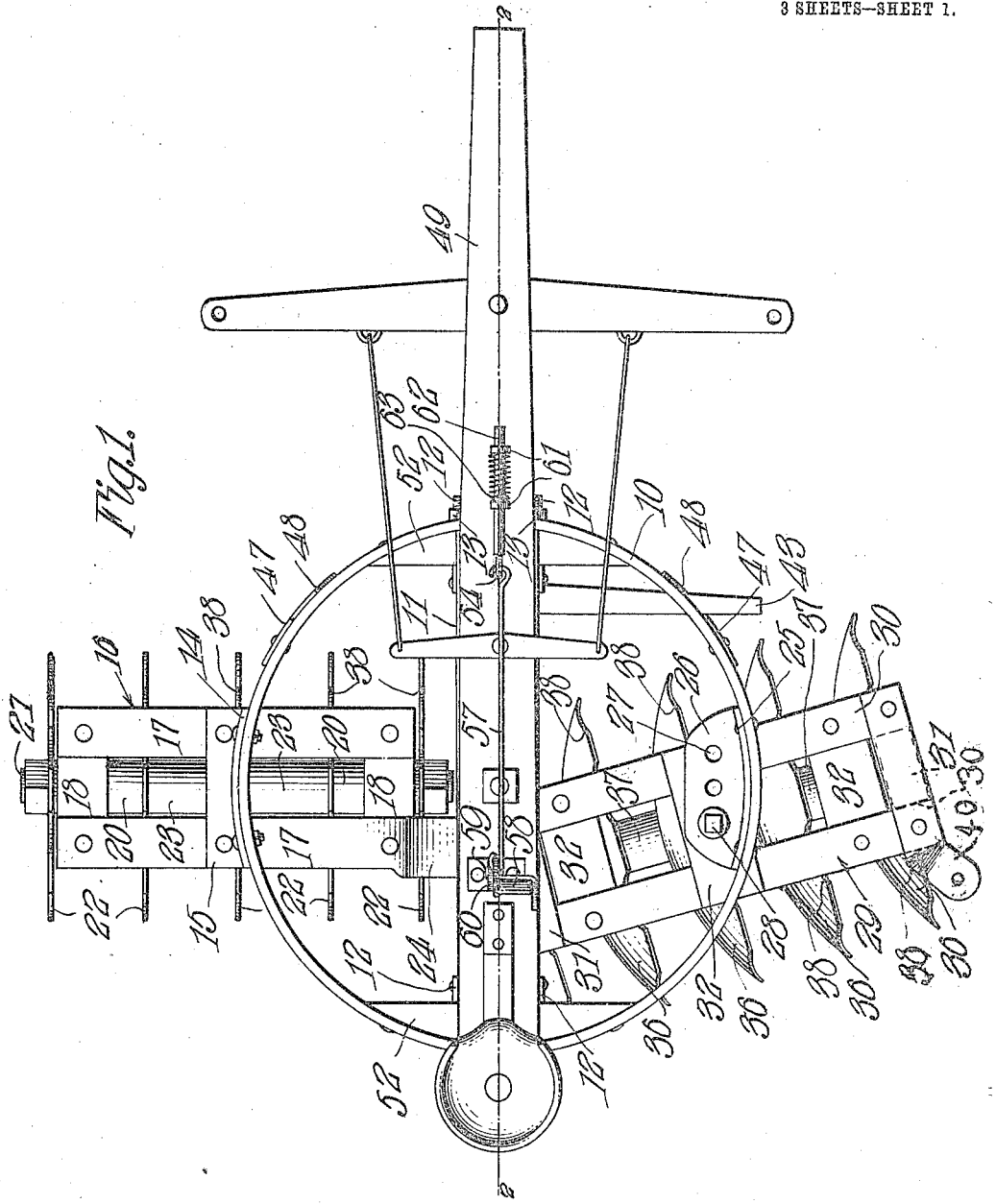

J. A. HANGER.
PLOW.
APPLICATION FILED MAY 9, 1908.

945,274.

Patented Jan. 4, 1910.
3 SHEETS—SHEET 1.

WITNESSES:
Chas. C. Richardson.

INVENTOR
James A. Hanger,
BY
Attorneys.

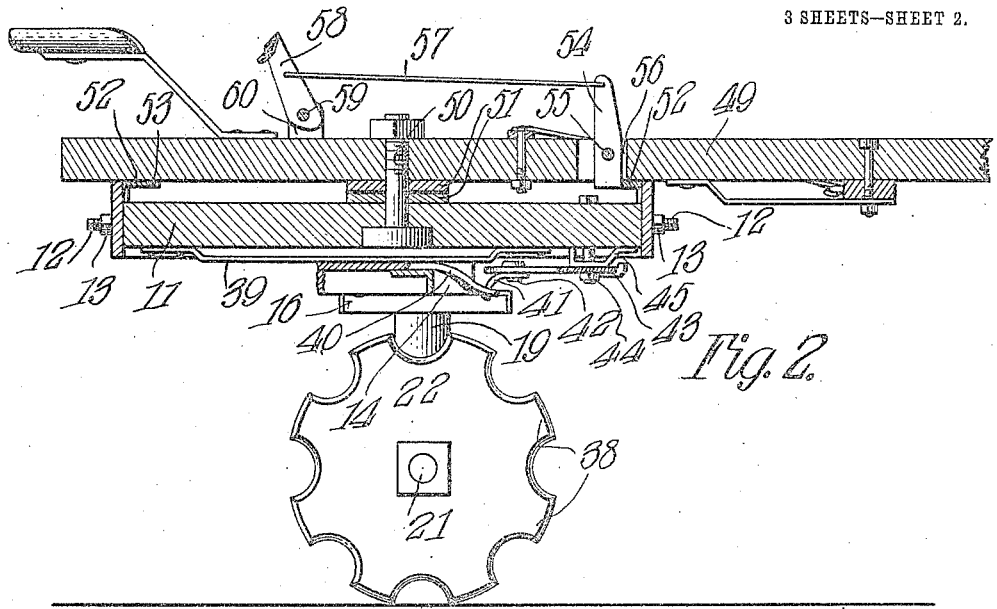
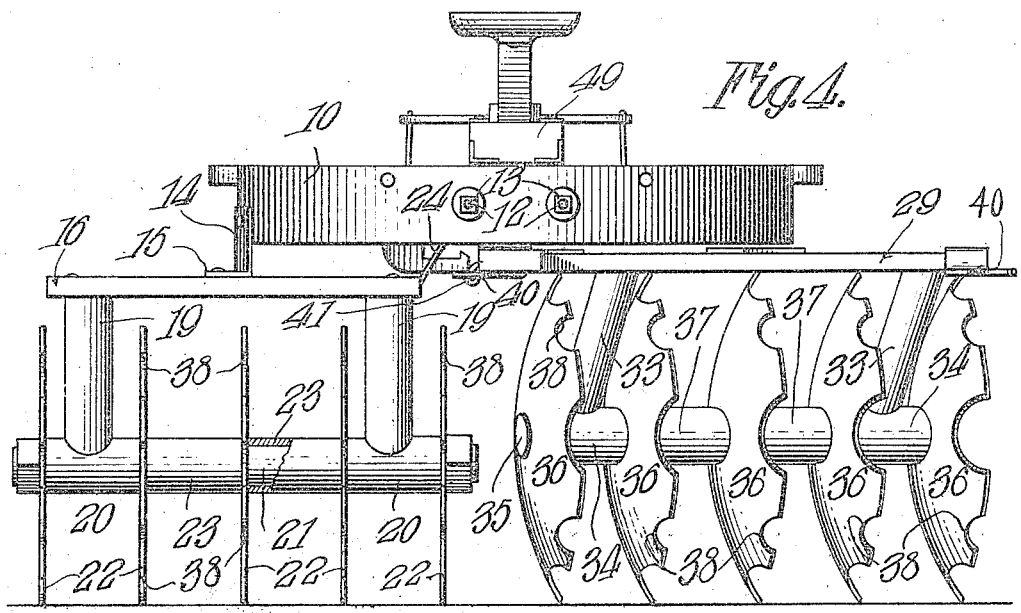

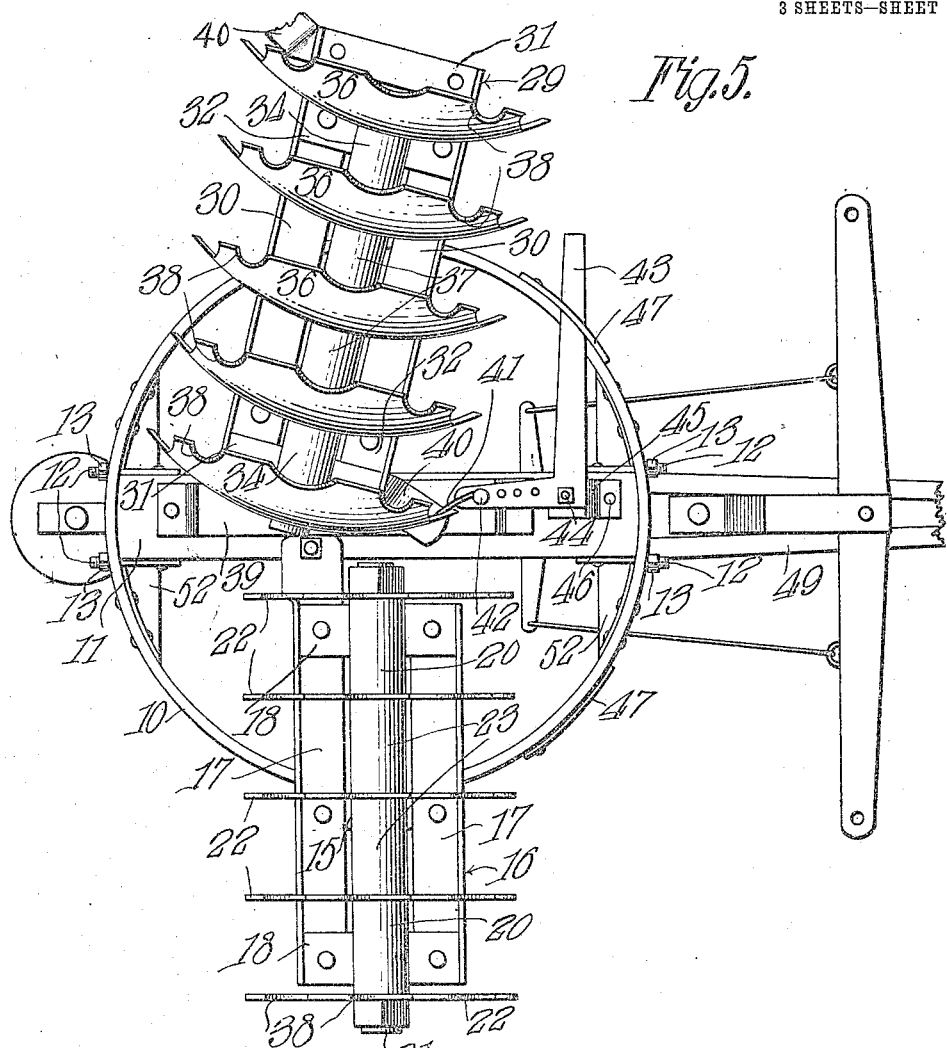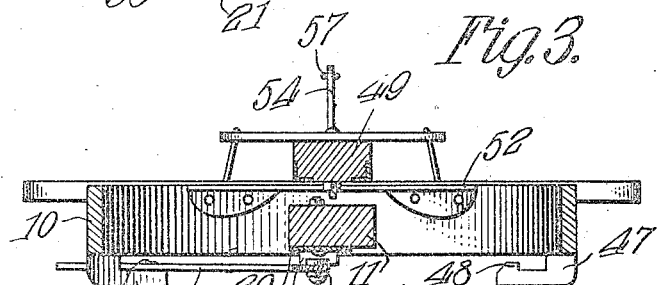

UNITED STATES PATENT OFFICE.

JAMES A. HANGER, OF DAYTON, WASHINGTON.

PLOW.

945,274.      Specification of Letters Patent.      Patented Jan. 4, 1910.

Application filed May 9, 1908. Serial No. 431,906.

*To all whom it may concern:*

Be it known that I, JAMES A. HANGER, a citizen of the United States, residing at Dayton, in the county of Columbia, State of Washington, have invented certain new and useful Improvements in Plows; and I do hereby declare the following to be a full, clear, and exact description of the invention, such as will enable others skilled in the art to which it appertains to make and use the same.

The invention relates to plows, and more particularly to the class of hill side disk plows of the gang type.

The primary object of the invention is the provision of a plow having a frame with a reversible draft beam supported thereon, and disk gangs, one immovable and the other adjustable in selected angular positions.

Another object of the invention is the provision of a plow having movable and immovable disk gangs, means for adjusting the movable disk gang at selected angular positions, and means for permitting a reverse line of draft of the plow without the necessity of bodily turning the entire plow.

In the drawings accompanying and forming part of this specification is illustrated in detail one advantageous form of embodiment of the invention which, to enable those skilled in the art to practice said invention, will be set forth at length in the following description, while the novelty of the invention will be included in the claims succeeding said description.

In the drawings:—Figure 1 is a top plan view of the invention. Fig. 2 is a longitudinal sectional view thereof. Fig. 3 is a transverse section. Fig. 4 is an end view of the invention looking in the direction of the line of draft. Fig. 5 is a bottom plan view of the invention.

Similar reference characters indicate corresponding parts throughout the several views in the drawings.

In the drawings the numeral 10 designates an annular frame, which in this instance is formed of metal, however, may be of any other suitable material, and extending centrally across the same is a supporting beam 11, having at opposite ends and connected to its side walls bolts 12, which project through the annular frame 10 and are held secured thereto by threaded engagement with nuts 13, so that said supporting beam is fixedly held in position in the frame.

On the outer face of the frame 10 is secured a plate 14 having an outwardly disposed lateral extension 15 at right angles thereto and to which is secured a disk gang supporting frame 16, including spaced parallel side bars 17, arranged at right angles to the supporting beam 11 and having secured thereto transverse end bars 18. Depending from the transverse end bars 18 are standards 19, having at their free ends bearings 20, for supporting and receiving a rotatable axle or shaft 21, upon which is fixedly connected a plurality of straight disks 22, which are held spaced from each other by sleeves 23, surrounding said axle. One of said parallel side bars 17 of the disk frame is extended upwardly at an inclination, and outwardly to form a connection 24 fixedly secured to the supporting beam 11, so as to hold the disk frame rigidly and immovable with respect to the plow frame.

At a point opposite the plate 14 and secured to the inner face of the annular frame 10 is a plate 25, having an extension 26 at right angles thereto which is provided with a plurality of openings 27. Adjustably connected by a bolt fastening 28, passing through one of the openings 27, is a movable disk gang supporting frame 29, having spaced parallel side bars 30 connected to transverse end bars 31, and an intermediate bearing plate 32, for the extension 26. Depending from the under face of the end bars 31 are standards 33 having bearings 34, receiving an axle or shaft 35, upon which is fixedly connected a plurality of spaced concaved disks 36, forming a gang. Said disks 36 are held in spaced relation by interposed sleeves 37, surrounding the axle. Each of the disks 22 and 36 is provided with peripheral beveled cutting teeth 38, however, other forms of disks may be employed if found desirable.

Secured to the under face of the supporting beam 11 and extending longitudinally thereof, is a yieldable bearing plate 39, adapted to contact with the inner end of the disk gang supporting frame 29, to permit a slight yielding movement thereof. Projecting from opposite sides of the disk gang supporting frame 29 and diagonally disposed at opposite ends thereof, are perforated lugs or ears 40, either of which is adapted for detachable connections with a link 41, the latter adjustably connected by a fastening 42 to a bell crank lever 43 pivotally connected as at 44 to a bracket 45, depending from the under side of the supporting beam 11 near one end thereof and secured thereto by fasteners 46. To limit the swinging movement of the bell crank lever 43 there are provided spaced stop members 47, formed on the lower edge of the annular frame 10 and having lateral hook extremities 48 directed toward each other for locking engagement with the bell crank lever 43 to hold the same in its adjusted position.

Rotatably mounted upon the supporting beam 11, is a reversible draft beam 49, which is pivotally connected thereto by a king bolt 50, surrounded by frictional wearing plates or washers 51, interposed between said supporting beam and draft beam. Above the opposite extremities of the supporting beam 11 and secured to the frame 10 are plates 52 having alining recesses 53 for locking engagement with a dog or latch member 54 pivoted as at 55 in an elongated slot 56 in the draft beam 49, and which member 54 is connected by a link 57 with a foot lever 58 pivoted as at 59 between lugs 60 secured to the upper face of the draft beam. In advance of the member 54 are spaced eyes 61, secured to the upper face of the draft beam 49, and in alinement with each other and in which is slidably mounted a pin 62, having a collar 63 forming a bearing for one end of a tension spring 64, in the form of a coiled retractile spring, surrounding the pin 62 and having its opposite end bearing against one eye 61, so as to hold said pin 62 in contact with the dog member 54 for normally maintaining the same in a position for locking engagement with recesses 53. In proximity to the foot lever 58 and carried by the draft beam 49 near its rear end is a seat 65, upon which the driver of the plow is to be seated.

In the actual operation of the invention after the plow has reached a predetermined distance on the hill side it is desired to reverse the direction of movement thereof. The operator on the seat 65 depresses or actuates the foot lever 58 and thereby disengages the dog or latch member 54 from the recess or notch with which it coöperates. It being understood of course that the plow at this moment is at a standstill and the operator then turns the draft animals so as to turn the draft beam 49 upon the king bolt 50 until said draft beam is reversed, whereupon the dog or latch member 54 engages its opposite coöperative recess, and thereby positions said draft beam with respect to the frame 10 so that the plow is ready to move in the reversed direction from that of its previous line of draft. Now prior to the starting of the plow in its reversed line of draft it is necessary for the operator to shift the bell crank lever 43 and to permit this the latter is disengaged from the hook extremity 48 and upon movement thereof the disk gang supporting frame 29 is moved to an adjusted angular position through the medium of the link 41 having connection with one of the ears 40 at the end of the disk gang supporting frame. It is understood that to maintain the disk gang supporting frame 29 in its adjusted position the bell crank lever 43, is brought into engagement with the opposite hook extremity 48 of the stop member 47 with respect to the one it previously engaged.

Having described the invention what is claimed is:—

1. A plow of the class described comprising an annular frame, a reversible rotary draft beam coöperative therewith, a fixed disk gang supporting frame having rotatable straight disks, a movable disk gang supporting frame having curved rotatable disks, and means for moving said last mentioned disk supporting frame in angular adjusted positions.

2. A plow of the class described comprising a frame having a reversible draft beam thereon, an immovable disk gang supporting frame, a plurality of spaced straight disks carried by the latter, an angularly adjustable disk gang supporting frame, and a plurality of spaced concave disks carried thereby.

3. A plow of the class described comprising a frame having a reversible draft beam thereon, an immovable disk gang supporting frame, a plurality of spaced straight disks carried by the latter, an angularly adjustable disk gang supporting frame, a plurality of spaced concave disks carried thereby, tension controlled locking means for holding the draft beam in its reversed position, a foot lever for actuating the locking means, and manually operable means for moving the disk gang supporting frame.

4. In a plow having a reversible draft beam, an immovable disk gang supporting frame having a plurality of spaced disks, a movable disk gang supporting frame having a plurality of spaced disks, and means for angularly adjusting the movable disk gang supporting frame.

In testimony whereof, I affix my signature, in presence of two witnesses.

JAMES A. HANGER.

Witnesses:
W. E. CAHILL,
BESSIE STEVENS.